United States Patent

[11] 3,534,828

| | | |
|---|---|---|
| [72] | Inventors | Leonard Stuart LePage Iver;<br>Denis Norton Harvey, Uxbridge; Reginald<br>Henry Taylor, Acton, London, England |
| [21] | Appl. No. | 774,840 |
| [22] | Filed | Nov. 12, 1968 |
| [45] | Patented | Oct. 20, 1970 |
| [73] | Assignee | The General Electric and English Electric<br>Companies Limited<br>London, England<br>a British Company |
| [32] | Priority | Nov. 10, 1967 |
| [33] | | Great Britain |
| [31] | | 51313/67 |

[54] REDUCTION OF NOISE EMITTED BY MACHINES
16 Claims, 3 Drawing Figs.

[52] U.S. Cl. .................................................... 181/33,
123/198
[51] Int. Cl. .................................................... F02b 77/00,
G10k 11/00
[50] Field of Search ........................................ 181/33,
33.1, 33.4; 123/198(E)

[56] References Cited

UNITED STATES PATENTS

| 1,831,797 | 11/1931 | Arnold | 181/33(.4)(UX) |
| 3,395,775 | 8/1968 | Smith | 181/33(.4)(UX) |

OTHER REFERENCES

| 824,247 | 11/1937 | France | 181/33(.4) |
| 1,094,332 | 12/1954 | France | 181/33(.4) |
| 1,064,749 | 9/1959 | Germany | 181/33(.4) |
| 1,127,733 | 4/1962 | Germany | 180/69 |
| 567,567 | 2/1945 | Great Britain | 181/33(.4) |

*Primary Examiner*—Robert S. Ward, Jr.
*Attorney*—Misegades and Douglas

ABSTRACT: This invention is concerned with noise-reducing cladding for machines. According to the invention a machine is closely clad by means of shaped panels which substantially enclose the machine, each panel comprising a layer of flexible foam plastic of substantial thickness, for example 2 inches, to which is secured a heavy outer layer, preferably comprising of lead, which is mechanically isolated from the outer surface of the machine by the foam plastic. This arrangement enables the cladding to have a low resonance frequency, so that noise above that frequency is contained within the cladding.

REDUCTION OF NOISE EMITTED BY MACHINES

This invention is concerned with the reduction of noise emitted by machines, for example internal combustion engines, gearboxes and compressors, by means of a noise-isolating barrier around the machine.

According to this invention a machine which is to be silenced is closely clad by means of shaped panels which substantially enclose the machine, each panel comprising a layer of flexible foam plastic of substantial thickness to which is secured a heavy outer layer of substantially nonresilient material which is mechanically completely isolated from the outer surface of the machine by the foam plastic, that is to say is held from engaging the machine surface by the foam. The outer layer is preferably lead or alternatively a lead-loaded plastics material. It must be substantially nonresilient (for example, not steel) so that it has little or no tendency itself to vibrate and therefore act as a source of noise; in other words, it should be inherently well-damped acoustically.

Some or all of the panels may be permanently secured to individual parts of the casing of the machine, but in a preferred construction the panels are all detachable from the machine, being assembled together around the machine during use with the aid of external fasteners such as toggle clips to secure the panels to one another, the fasteners being secured to the outer layers of the panels. In this preferred construction, as many panels as possible should be individually supported at least partially by the machine so as to distribute as widely as possible the supporting pressures applied to the foam plastic of the panels; in particular it is desirable to avoid having several panels hanging from a higher panel with consequent compression of parts of the foam plastic of the higher panel.

In a preferred construction each panel has an inner skin of fibre-reinforced resin (*e.g.* epoxy resin) secured to the inner face of the foam plastic, and the heavy outer layer consists of lead sheet sandwiched between further skins of fibre-reinforced resin.

The foam plastic must be of substantial thickness and should be soft (*i.e.* have a low resistance to flexing), and the outer layer must be heavy, so that the natural resonance frequency of the heavy outer layer (*e.g.* the resin/lead/resin sandwich) when oscillating under the influence of its mass, and of the spring effect of the foam plastic, is as low as possible. Ideally this resonance frequency should be appreciably lower than the lowest frequency of significant noise emitted by the machine. In the case of an internal combustion engine, for example, the lowest frequency of significant noise is usually the speed of rotation of the crankshaft. However, in the case of an engine or other rotary machine rotating at a speed of about 30 revs./second or less, for which it is difficult to achieve a lower resonance frequency for the cladding, the cladding should at least preferably be so constructed as to have a resonance frequency below that of the second harmonic of the machine noise (*i.e.* below 60 cycles/sec. for a 30 rev./sec. machine), assuming that this second harmonic is the second lowest significant noise frequency; the resonance frequency in this case should preferably fall between but well clear of both the first harmonic of machine noise (*i.e.* the basic machine noise frequency) and the next higher significant noise frequency.

As already mentioned, the plastic foam should be soft, the reason for this being that the softer the foam, the lower is the resonance frequency of oscillation of the heavy layer. Moreover the foam should, as far as possible, have an open-cell structure since open cells result in a relatively low resilience (because of the absence of pockets of air which compress resiliently) and a relatively high degree of sound absorption through mechanical hysteresis. A preferred foam is the polyurethane foam made by Aeropreen Ltd., known as their foam AOP34FR, which has approximately a 70 percent open-cellular structure and a hardness, tested according to BS3667, such that a 50 percent compression produced by an 8 inch diameter circular indentor requires a load of 4 to 6 kgs. Other similar polyurethane foams may however be used.

To minimise the risk of fire, the edge surface of the foam is preferably sealed to prevent the foam soaking up oil or fuel. This may be achieved by moulding the plastic foam parts of the panels individually in such a way as to leave a skin of the parent material to form the outer surface of the foam moulding. Alternatively the foam may be cut from large premoulded flat sheets, and the edges of the foam parts may be sealed by spraying on a film of a suitable flexible sealing material, for example the rubber-based liquid made by Hall Industrial Finishers Ltd., and identified by the reference 8/949/252 (known commonly as Blue Liquid). When sealing by means of a different material in this way, it is important to ensure that the sealing film material is not hard (and will not harden through use) so as to constitute any degree of mechanical short circuit from the machine casing to the heavy outer layer of the cladding panel.

In general it has been found that the best cladding panel according to this invention, for most purposes, has a layer of polyurethane foam of about 2 inch thickness and a heavy outer layer of about 4 to 5 pounds weight per sq. ft., giving a natural resonance frequency of about 30 cycles/sec. For this purpose the weight of the heavy outer layer is conveniently provided mainly by lead sheet of 0.0675 inches thickness supplemented slightly by inner and outer layers of fibre-reinforced resin. It is unnecessary for most purposes to increase the weight of the heavy outer layer, and a substantial reduction in this weight is also undesirable because it raises considerably the natural resonance frequency of the cladding. As regards the thickness of the plastic foam, an increase much above 2 inches is undesirable for most purposes because a foam of this softness may not be capable of properly supporting the weight of the heavy outer layer; the foam thickness can be reduced below 2 inches, but this raises the natural resonance frequency and therefore increases the transmission of noise components at relatively low frequencies. For example, a panel with a 1 inch thick layer of foam has been found experimentally to be fairly effective in limiting sound transmission at say 500 cycles/sec., and is indeed almost as good as a panel with 2 inch thickness of foam at that frequency, but at about 60 to 80 cycles/sec. it allows through far more noise than a panel with a 2 inch thick foam.

An example of a cladding system according to this invention is shown in the accompanying drawings in which the cladding is applied to a Napiers Deltic internal combustion engine. In these drawings.

Figure 1:
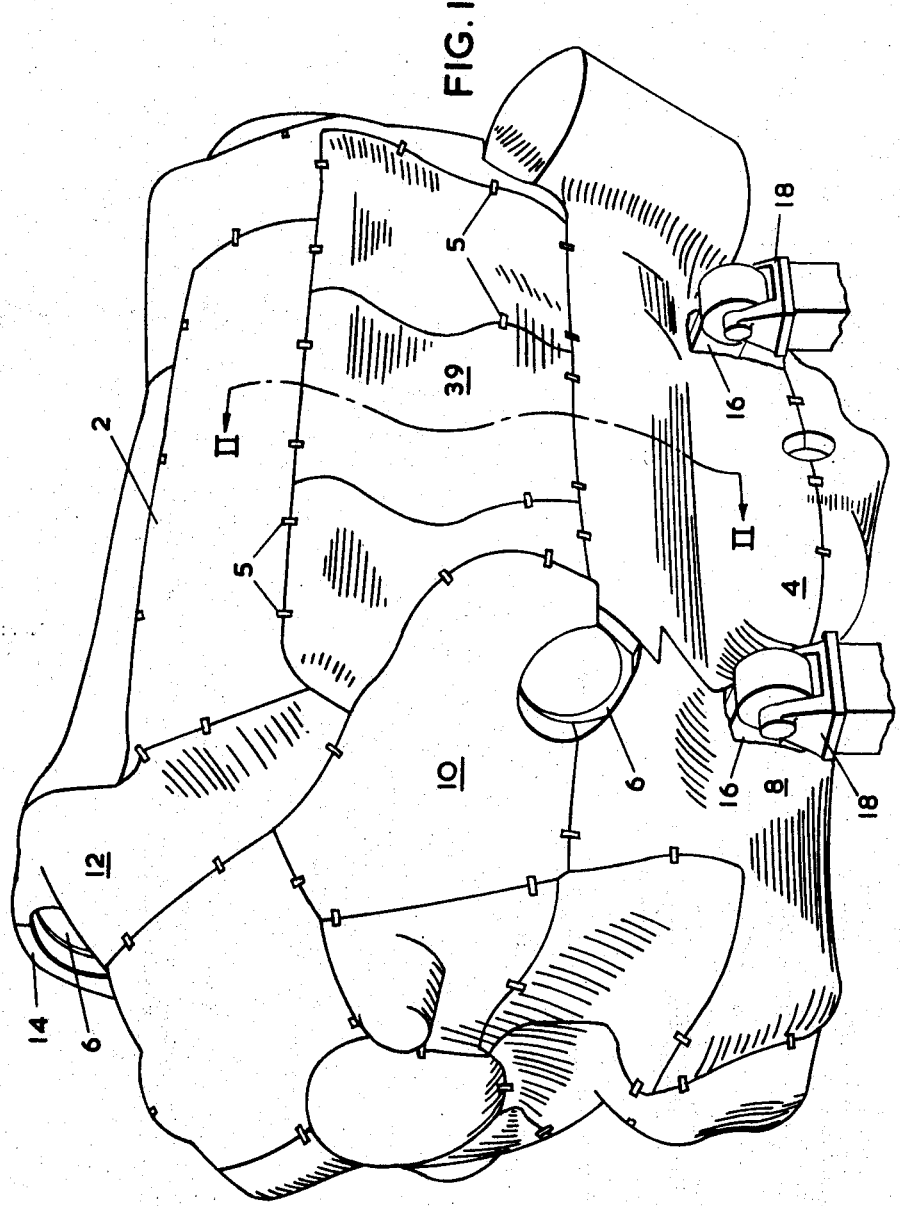
FIG. 1 is a perspective view showing the fully clad engine.

As shown in FIG. 1, the engine cladding is formed by a large number of panels of which, for example, there are three panels similar to the panel 2 which cover the engine crank case cover plates. Further panels are arranged to cover other parts to which access can be obtained simply by removing one panel. For example, fuel pumps on one side of the engine can be reached by removing a panel 4, and there is a similar panel on the other side of the engine. The panels are secured to one another by means of toggle clips 5 which are shown enlarged in FIG. 3.

The engine has three exhaust ducts (not shown) connected during use to ports 6 (of which only two can be seen in the drawing). It should be noted that the panels around the exhausts, namely the panels 8, 10, 12 and 14, are so arranged that their adjoining edges lie along diameters of the exhaust ports 6 so that either or both of the panels associated with any given exhaust duct can be removed without removing the duct.

The engine has a resilient mounting by means of lugs 16 which are secured to stationary brackets 18. The brackets 18 and the parts of the lugs 16 which are shown extending out of the cladding are preferably covered by further cladding panels to obtain the optimum noise reduction.

Figure 3:
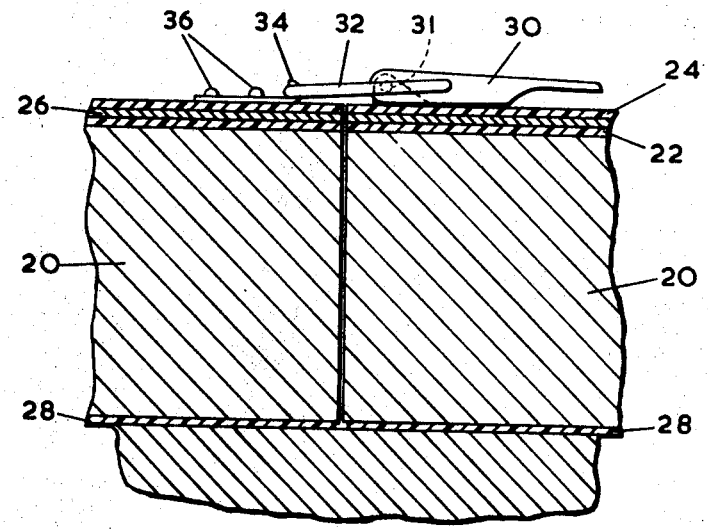
FIG. 3 is an enlarged section showing the composition of each cladding panel and a joint between abutting edges of two adjacent panels.

With reference to FIG. 3 it will be seen that each cladding panel consists of a 2 inch layer of polyurethane foam 20 with a heavy outer layer formed by skins 22 and 24 which enclose between them a lead sheet 26. Each panel is completed by an inner skin 28. The skins 22, 24 and 28 all consist of resin reinforced by glass fibre in the form of mats of chopped strands. For example each skin may be formed by two layers of 1 ounce matting making a total thickness of about one-sixteenth inch. The lead sheet 26 is of 0.067 inches thickness.

As shown in FIG. 3, each toggle clip is formed by a body 30 which is pivoted to one panel by a pin 31 passing through one end of the body 30 and through a lug secured to the heavy outer layer of the panel. A loop 32 pivoted to the body 30 engages a hook 34 on the other panel when the body 30 is moved manually to the position shown in FIG. 3. The clip may be released by raising the right-hand end of the body 30 so as to allow the loop 32 to be disengaged from the hook 34. Screws 36 which secure the hook 34 to the outer skin of one panel may either engage in threaded bores in the outer layer of the panel, or may engage nuts set in the resin layer 22 of the panel during manufacture; similar screws (not shown) secure the lug on the other panel to which the body 30 is pivoted.

Figure 2:
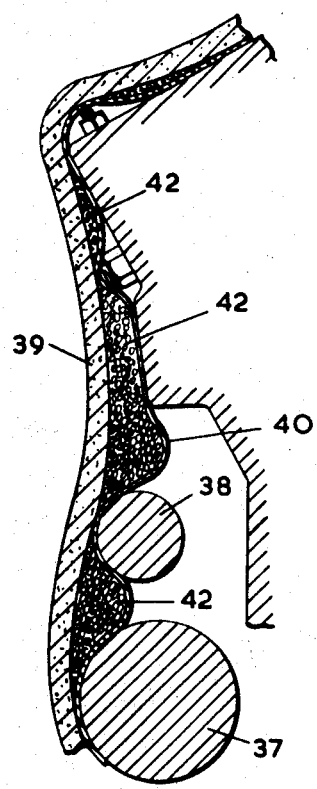
FIG. 2 is a fragmentary section on the line II–II in FIG. 1.

FIG. 2 shows by way of example how the complicated external contours of a machine such as the Deltic engine are preferably dealt with when forming cladding panels. The important point about this is that it is desirable to avoid as far as possible the presence of a large air gap between the outer casing of the machine and the inner skin of the cladding panel. In FIG. 2 the presence of an exhaust pipe 36 and of an inlet pipe 38 produces deep spaces in which the noise of the vibrating casing 37 tends to be amplified. To reduce this amplification of noise as far as possible, the panel has its inner skin 40 in this case so shaped as to follow as closely as possible the external contours of the engine without producing reentrant pockets which would interfere with the withdrawal of the panel. The foam material 39 is still of uniform thickness, being cut from flat sheets, and in order to avoid having to shape the foam and also the heavy outer layer in the same way as the inner skin 40, a filler substance consisting of granulated Vermiculite mixed with a thermosetting resin (for example Araldite) is used in areas 42 so that the outer surface of the filler presents a relatively smooth contour to which the foam plastic can be secured by adhesive.

Close hugging of the external contours of the machine by the inner skins of the panels is desirable in order to reduce or eliminate sound-amplifying air pockets between the machine and the cladding. Moreover it has the desirable effect of giving support to individual panels so that the panels do not all hang from a few top panels; this last condition could result in the foam of the upper panels being compressed by the suspended weights of the lower panels. Excessive compression of the foam should be avoided. In order to avoid this happening in the case of a machine with large flat sides, the sides of the machine may be provided with added means for supporting or securing the inner skins of the side panels.

In preparing moulds on which suitable cladding panels can be formed for any particular machine, a preferred procedure is as follows. First the machine is covered by means of a sheet of flexible plastic, for example P.V.C. Then a layer of wire netting, for example one-half inch mesh, is hand moulded over the machine so as to conform closely to the external contours of the machine without having reentrant pockets. Then the P.V.C. and wire mesh are sprayed with a material such as the rubber-based liquid 8/949/252 referred to previously, to form a continuous skin. This skin is then sprayed with a soluble release agent, and a mould is then formed by laying up pieces of woven glass cloth impregnated with resin, while ensuring that the pieces of cloth overlap so as to unite when the resin is cured. A heavier body may then be formed by further laying up of glass fibre matting formed by chopped strands of 2 ounces/sq.ft. weight. After the resin has all cured, the wire mesh and P.V.C. are removed, and the shaped fibre-reinforced resin may be cut into the appropriate sections corresponding to the required cladding panels, and each panel-shaped section of fibre-reinforced resin can be used as a mould with which to manufacture the inner skin of the cladding panels on a production basis.

As already mentioned, the inner skin of the cladding panels may be formed by glass fibre matting. This may be laid on the mould and cured before the foam is secured in place by means of a suitable contact adhesive. The skin 22 shown in FIG. 3 may then be formed by laying on glass fibre matting impregnated with resin, and then curing the resin. The lead sheeting is preferably shaped on a separate mould and then secured to the skin 22 by means of a contact adhesive, the lead being painted first with an etching liquid, if necessary, to ensure good adhesion. Finally the outer skin 24 may be formed by laying on fibre glass matting impregnated with resin and then curing the resin; the resin in this case serves as the adhesive to secure the skin 24 to the lead.

We claim:
1. A machine closely clad by means of shaped panels which substantially enclose the machine, each panel comprising a layer of flexible foam plastic of substantial thickness to which is secured a heavy outer layer of substantially nonresilient material which is mechanically completely isolated from the outer surface of the machine by the foam plastic.

2. A machine according to claim 1 in which the heavy outer layer is of lead.

3. A machine according to claim 1 including fasteners which are secured to the adjacent edges of the outer layers of adjacent panels and secure the panels to one another.

4. A machine according to claim 3 in which the fasteners are toggle clips.

5. A machine according to claim 1 in which the foam plastic has a mainly open cellular structure.

6. A machine according to claim 5 in which the foam plastic is approximately 2 inches thick.

7. A machine according to claim 1 in which the heavy outer layer is approximately of 4 to 5 pounds weight per square foot.

8. A machine according to claim 1 in which the natural resonance frequency of the cladding is below the second harmonic of noise emitted by the machine during use.

9. A machine according to claim 8 in which the natural resonance frequency of the cladding is below the lowest frequency of significant noise emitted by the machine during use.

10. A machine according to claim 1 in which each panel includes an inner skin of fibre-reinforced resin secured to the inner face of the foam plastic.

11. A machine according to claim 10 in which the inner skin closely conforms to the contours of the machine and forms recesses which are filled with a filler substance to present a smoother contour to which the foam plastic is secured.

12. A machine according to claim 1 in which the heavy outer layer of each panel consists of lead sheet sandwiched between skins of fibre-reinforced resin.

13. Sound-isolating cladding material comprising an inner skin of fibre-reinforced resin to lie adjacent to the machine to be clad, a layer of flexible foam plastic of substantial thickness adhering to the inner skin, and a heavy outer layer which adheres to the face of the foam plastic remote from the inner skin and comprising a layer of lead and a skin of fibre-reinforced resin.

14. Sound-isolating cladding material according to claim 13 in which the thickness of the layer of foam plastic is approximately 2 inches.

15. Sound-isolating cladding material according to claim 13 in which the heavy outer layer comprises a layer of lead sandwiched between skins of fibre-reinforced resin.

16. Sound-isolating cladding material according to claim 13 in which the weight of the heavy outer layer is approximately 4 to 5 pounds per square foot.